United States Patent [19]

Binner

[11] 4,401,106

[45] Aug. 30, 1983

[54] SOLAR AND STANDBY FIREPLACE SYSTEM

[76] Inventor: Tihamer S. Binner, 304 West Point Ave., Somerset, N.J. 08873

[21] Appl. No.: 273,432

[22] Filed: Jun. 15, 1981

[51] Int. Cl.³ ............................................... F24J 3/02
[52] U.S. Cl. .................................... 126/450; 126/428; 126/429; 126/435; 126/437; 126/131; 126/121; 126/446; 237/51; 237/46
[58] Field of Search ............... 126/427, 416, 121, 450, 126/437, 428, 429, 435, 131, 446; 237/51

[56] References Cited

U.S. PATENT DOCUMENTS

| | | | |
|---|---|---|---|
| 3,250,269 | 5/1966 | Sherock | 126/429 X |
| 3,957,109 | 5/1976 | Worthington | 126/429 X |
| 4,049,194 | 9/1977 | Tice et al. | 126/427 |
| 4,061,129 | 12/1977 | Wilson | 126/422 |
| 4,132,222 | 1/1979 | Roark | 126/450 |
| 4,132,263 | 1/1979 | Stinnett | 237/51 X |
| 4,172,442 | 10/1979 | Boblitz | 126/422 |
| 4,215,673 | 8/1980 | Cohen | 126/429 X |
| 4,335,703 | 6/1982 | Klank | 237/51 X |

Primary Examiner—Larry Jones
Attorney, Agent, or Firm—Richard L. Miller

[57] ABSTRACT

A home heating system for supplying heated air and water is made up of a solar energy heating unit. The solar energy heating unit is provided with a channel in an insulating layer mounted within the housing, which channel directs heated air to the interior of the home. The interior of the housing also is provided with a plurality of water pipes for heating water. The water is preferably supplied from an indoor swimming pool and redirected back to the indoor swimming pool after being heated. A fireplace is also provided in conjunction with the solar energy heating unit, which fireplace acts as a back-up unit when the solar unit is not operable due to insufficient sunlight. The fireplace contains a conventional hearth and flue and is provided with a plurality of air conduits and water pipes within the flue so that the air and water may be heated by the fire in the hearth.

5 Claims, 3 Drawing Figures

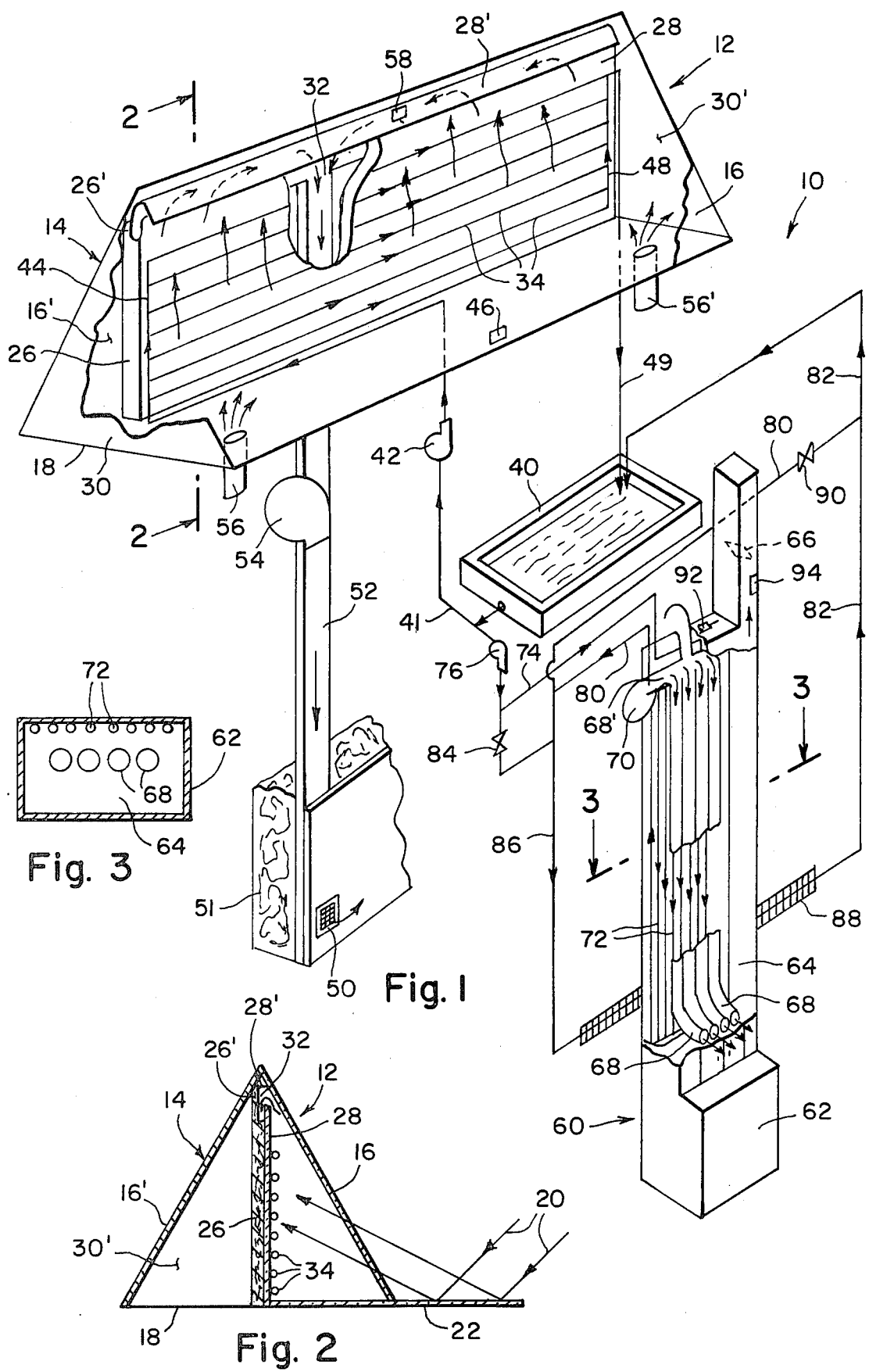

SOLAR AND STANDBY FIREPLACE SYSTEM

BACKGROUND OF THE INVENTION

The present invention is directed to a home heating system for heating the interior of a home and supplying the home with heated water.

Many well-known types of systems are available and used, and one such system utilized today and receiving increasing attention is solar energy. Solar energy is typically tapped by solar energy collecting panels provided upon the roof of a house which solar panels store heat within their housing for heating air, which is subsequently used to heat a home.

Conventional systems of heating a home and providing hot water are becoming more and more expensive to operate due to the escalating cost of oil and natural gas, which has made solar energy an attractive alternative, for at least a supplemental source of energy.

SUMMARY OF THE INVENTION

It is, therefore, the primary object of the present invention to provide a home heating system utilizing a novel solar energy heating unit with side panels for collecting the sun's rays, and connecting such a unit to the interior of a home to heat it, while also providing a means and method of supplying heated water to a swimming pool or the like, or to the interior of the home.

It is also the object of the present invention to combine the solar energy heating unit of the present invention in combination with a fireplace contained within the home, which fireplace serves to act as a back-up system for heating air and water when the solar energy heating unit is not operable due to the lack of sufficient sun rays, as would occur on a series of cloudy days.

It is also the object of the present invention to provide such a system where the fireplace may be used in conjunction with the solar energy heating unit while such unit is operating to supply additional heated air to the interior of the home.

To accomplish these above objectives, the novel solar energy heating unit of the present invention is provided with a housing having a V-shaped cross-section and made up of a pair of clear, transparent side panels of glass or plastic which allow rays from the sun to impinge upon a reflective layer of material within the housing. A plurality of water pipes are also provided in the housing so that as the air within the housing is heated by the sun's rays and by the reflection thereof and by the greenhouse effect caused by the glass panels, the water is heated and directed to, for example, the source from which it came, which in the preferred form of the invention is an indoor swimming pool. The air that has been heated within the housing of the solar heating unit is also directed down a channel made in an insulating layer, which insulating layer divided the V-shaped housing in half and which is parallel with and coplanar with the reflective layer. The channel directs the heated air downwardly to the interior of the home, to heat a room or rooms. Fresh ambient air is continuously supplied to the interior of the V-shaped housing for subsequent heating when the solar heating unit is in operation.

The back-up fireplace system comprises a conventional hearth and flue, and within the flue there is provided a plurality of air conduits for redirecting heated air back into the interior of the room where the fireplace is situated. The air conduits receive a fresh supply of ambient air, which air is forced down the conduits by an air blower controllable by a conventional switch.

Within the flue there is also provided a plurality of water pipes which extend up and down in the flue in a sinuous fashion, so that as the water passes through these water pipes, the heat from the hearth will heat the water therein. The water is supplied from the indoor swimming pool in the preferred form of the invention, but may, of course, be supplied for another source for which is desired to be to make the water thereof heated. The water is pumped to the water pipes in the flue by a conventional pump operable by a conventional switch, and after being heated, is returned to the swimming pool or the like along a conduit pathway connecting the outlet of the water pipes with the swimming pool.

A tertiary heating unit is also provided for heating the water from the swimming pool, or the like, in the event that neither the primary solar energy heating unit is operating nor the back-up fireplace unit is being used. The tertiary unit is a conventional radiator which is supplied with the water from the swimming pool, or the like, and redirected back to the swimming pool.

Fluid control means are also provided in the heating system of the present invention which serves to bypass the fireplace and send the water from the swimming pool, or the like, to the tertiary heating unit or radiator and back again to the swimming pool.

BRIEF DESCRIPTION OF THE DRAWING FIGURES

The invention will be more readily understood with reference to the accompanying drawing, wherein FIG. 1 is a schematic view of the home heating system of the present invention;

FIG. 2 is a cross-sectional view taken along line 2—2 of FIG. 1 showing the structure of solar heating unit; and FIG. 3 is a crosss-sectional view taken along line 3—3 of FIG. 1 showing the novel fireplace with the water heating elements and air recirculation conduits therein.

DETAILED DESCRIPTION OF THE PREFERRED EMBODIMENT

Referring now to the drawings, the novel home heating system of the present invention is shown generally by reference numeral 10. The home heating system has a primary source of heat generation, which is a solar energy heat storage element 12 which is mounted upon the roof of a house, or the like, where the sun's rays are most likely to strike it. The solar energy storage element 12 is made of a main housing 14 of V-shaped cross-section. The housing 14 has a pair of side panels 16, 16' which are suitably bonded at one respective end to form the vertex of the V-shaped housing, and are joined at their other lower ends by a base panel 18, which base panel 18 is suitably fastened to the roof of a house, or the like. The side panels 16, 16' are made of clear transparent material, such as glass or plastic, so that the sun's rays 20 may readily pass therethrough. The use of clear, transparent, panels 16, 16' provides for the well-known green-house effect where ultra-violet rays are entrapped within the housing, thus storing heat therein. The bottom panel 18 is also formed with a reflective surface 22, and extends out beyond the jointure with the end of the panel 16 so that the greatest amount of light rays 20 may be directed to the interior of the housing.

Within the housing 14 of the solar energy storage unit, there is provided a vertically upstanding insulating layer 26 made of a suitable insulating material, which layer serves to hold in the warmth of the sun's rays within the half of the housing defined between the panel 16 and the insulating layer 26. A reflective layer 28 is provided also within the housing parallel to and a coextensive with the insulating layer 26, which reflective layer 28 serves to redirect the sun rays impinging thereon back and forth within the housing for maximum heating. The reflective layer is preferably affixed to the insulating layer along the length thereof, taken in the direction from end panel 30 to end panel 30'.

As can be seen in FIG. 2, the height of the insulating layer 26 extends upwardly to the vertex of the housing, and defines near the top thereof a portion 26' of reduced thickness. A channel 32 is formed along the width of the insulating layer 26 in that portion thereof extending from the reduced-thickness portion 26' downwardly to the base panel 18, which channel acts as a hot air conduit for the heated air in the housing. The top of the reflective layer 28 projects slightly beyond the top of the channel 32 to form a funnel through which the heated air enters the channel. Fixedly mounted directly in front of the reflective layer 28 are a plurality of parallel water pipes 34 for conveying water therethrough, which water is heated by the hot ambient air within the housing.

It is, thus, seen that the solar energy storage unit 12 serves to first heat air therein, and to heat water passed through it, which heated air may be used to heat the interior of a house, room, etc. The heated water may also be used for subsequent benefit, such as for an indoor swimming pool 40. In this preferred form of the invention, water from the swimming pool 40 is directed to the inlet end of the pipes 34, as shown schematically in FIG. 1, by conduit shown by reference numeral 41. A pump 42 pumps the water from the swimming pool to the inlet end of the water pipes, shown generally by reference numeral 44 in FIG. 1. After passing through the water pipes 34, and after being heated to a requisite temperature, which temperature is controlled by a thermostat 46, the water exits at the outlet end of the water pipes indicated generally by reference numeral 48, and sent back to the swimming pool by conduit 49. As long as the temperature of the ambient air in the housing is at the requisite temperature, for example 85 degrees F., the pump 42 will supply water to the water pipes. Once the temperature falls below that level, the pump automatically shuts off in the well-known manner.

The air which has been heated within the housing 14 is directed downwardly through the channel 32 to a conventional room air outlet 50 with insulator 51 via conduit 52. Air blower 54 forces the heated air downwardly through the conduit 52. A continuous supply of fresh ambient air is supplied to the housing interior by a pair of dampers 56, 56', which are typically to be mounted on the ceiling of the room or rooms to be heated by the air. The dampers 56, 56' are manually operable in a well-known manner. The air blower 54 is controlled by a thermostat switch 58, of conventional design, and automatically turns on the blower at the specified preset temperature, again in a well-known manner.

It is to be understood that while the solar energy heating unit 12 is shown in FIG. 2 with only one half of the interior of the housing utilizing the sun's rays, which may be made optimal by mounting the unit on a rotatable platform for directing the side panel 16 at all times to the sun's rays, the other half of the housing interior may also be provided with a similar reflective layer and plurality of water pipes. In this case, the unit may be mounted on a stationary platform.

It is noted that the top of the reflective layer 28 is arched at 28', which arched portion humps over a portion of the water pipes so that rays may be reflected back down toward the pipes and to capture as much of the reflected rays as possible.

It is, however, very often the case that the solar energy heating unit 12 is not able to provide sufficient heating capacity, as on a series of cloudy days. In this instance, the present invention provides a secondary heating source for heating ambient air as well as water from a swimming pool, or the like. The secondary heating source is a fireplace 60 having the conventional hearth 62, flue 64 and damper 66. However, provided within the chute or flue 64 are a plurality of air conduits 68 which air conduits extend from a common line 68' provided with an air blower 70. When the fireplace is used, so that a fire is provided in the hearth, the heated air within the chute or flue 64 will heat the air conduits 68, thus heating also the air within the conduits. The air within the air conduits is ambient air supplied from an outside source provided in the chimney, or from the room. The thus-heated air in the conduits 68 are blown down the conduits to exit at a location adjacent the hearth, so that the heat given off by the hearth is increased above that it would normally give off.

Further, while the fire in the hearth heats the air in the conduits 68, it also heats water provided in a plurality of water pipes 72 mounted within the flue at a location rearward of the conduits 68 and parallel therewith. The water pipes 72 form an up-and-down sinuous network for maximizing the exposure of the water to the heat. The water in the water pipes 72 is supplied from the swimming pool 40, or the like, via a water conduit 74 provided with a pump 76 for pumping the water to the pipes 72. As the water is heated in the network of water, it exits at the outlet thereof and is directed back to the swimming pool by conduits 80 and 82.

If the fireplace and solar unit are not being used, and it is still desired to heat the water from the swimming pool, a tertiary heating unit is provided for heating just the water, which tertiary unit is a conventional radiator. In this instance, a bypass valve 84 redirects the water through line 86, through the radiator 88 and back up through line 82. Bypass valve 90 in line 80 prevents the flow of the water therethrough in this instance. Bypass valves 84 and 90 are of conventional design.

FIG. 3 shows the preferred form of the water pipes and air conduits 68, which as shown, are 8 turns and 4 in number, respectively. Of course, different designs and number of conduits may be employed and still fall within the scope and spirit of the invention.

The pump 76 is controlled by a switch 92, while the air blower 70 is controlled by switch 94, in the conventional manner.

While a specific embodiment of the invention has been shown and described, it is to be understood that numerous changes and modifications may be made therein without departing from the scope and spirit of the invention as set out in the appended claims.

What is claimed is:

1. A solar energy heating unit comprising, in combination, a V-shaped housing made of clear material, said V-shaped housing having a first side panel and a second side panel, and a base portion connecting first ends of said first and second side panels; an insulating layer means positioned within said housing perpendicular to said base portion extending from said base portion toward the vertex of said housing, said insulating layer extending along most of the length of said housing; a reflecting layer means adjacent to said insulating layer means for reflecting light rays from the sun; water pipe means within said housing, said water pipe means being heated by the ambient air within the housing to thereby heat the water therein, wherein said insulating layer means comprises a channel formed midway along the length thereof and extending downwardly in a direction from said vertex of said housing toward said base portion, said channel serving as an air duct for directing heated air downwardly to a room of a house, wherein said reflecting layer means is in abutting relationship to said insulating layer means and attached thereto, said reflecting layer means covering said channel along the length of said channel, said reflecting layer means extending upwardly beyond said channel toward said vertex and said insulating layer means having an upper portion thereof of reduced width and which is affixed to near said vertex, said reduced portion of said insulating layer means and the portion of said reflecting layer means defining therebetween a space for directing heated air into said channel.

2. The solar energy heating unit according to claim 1, further comprising another layer of reflecting material, said another layer being mounted to said insulating layer means on the other side thereof to which said reflecting layer means is mounted; said insulating layer means having another channel formed therein on the side thereof remote from the side in which is formed said channel; and an additional pipe means positioned adjacent to said another reflecting layer.

3. A home heating system comprising, in combination, a solar energy heating means for mounting upon a house; first means for connecting said solar energy heating means to the interior of the house for supplying warm air thereto; second means connected to said solar energy heating means and connected to a source of water for heating the water, wherein said solar energy heating means comprises a housing of clear material for allowing the sun's rays to pass therethrough, an insulating layer mounted within said housing, a reflecting layer attached to said insulating layer for reflecting the sun's rays, water pipe means for passage therethrough of water, said water pipe means being positioned in front of said reflecting layer, wherein said housing has a V-shaped cross-section and comprises a first side panel, a second side panel, and a base portion connecting the first end of said first and second side panels, the second end faces of said first and second side panels being connected together to form the vertex of said V-shaped housing, wherein said insulating layer is mounted transverse of said base portion and extends upwardly therefrom toward said vertex of said housing, said reflecting layer running coplanar with and parallel to said insulating layer, wherein said insulating layer comprises an air duct extending along the width thereof in a direction transverse to said base portion, said first connecting means having a first end in fluid communication with said air duct for directing heated air to the interior of the house, wherein said reflecting layer overlays said insulating layer along the entire length of said air duct, and said water pipe means comprises a plurality of pipes extending in the direction transverse to the direction of said air duct; said second connecting means comprising a first conduit means having a first end in fluid communication with the source of water to be heated and a second end in fluid communication with a first inlet end of said plurality of pipes, and a second conduit means having a first end in fluid communication with the source of water and a second end in fluid communication with the second outlet end of said plurality of pipes, said first conduit means supplying water to said plurality of pipes from said source of water, and said second conduit means returning the heated water for said second outlet end of said plurality of pipes to the source of water to supply heated water.

4. The home heating system according to claim 3, wherein said first conduit means comprises a pump for supplying the water from the source of water to the first inlet end of said plurality of pipes.

5. The home heating system according to claim 3, wherein said first connecting means comprises a first end in fluid communication with the lower end of said air duct, and a second end in fluid communication with the interior of the home.

* * * * *